H. H. HODGSON.
WHEEL TIRE.
APPLICATION FILED JUNE 4, 1909.

946,044.

Patented Jan. 11, 1910.

WITNESSES:

INVENTOR.
Howard H. Hodgson
BY
ATTORNEYS

UNITED STATES PATENT OFFICE.

HOWARD H. HODGSON, OF TORONTO, ONTARIO, CANADA.

WHEEL-TIRE.

946,044.

Specification of Letters Patent.

Patented Jan. 11, 1910

Application filed June 4, 1909. Serial No. 500,099.

*To all whom it may concern:*

Be it known that I, HOWARD H. HODGSON, of the city of Toronto, in the Province of Ontario, Canada, have invented certain new and useful Improvements in Wheel-Tires, of which the following is a specification.

This invention relates to tires of the type in which a rubber tire is formed in sections having flanged bases held in contact with inwardly turned flanges on a recessed rim by means of a hoop spring. In such tires I have experienced much trouble owing to wearing of the flanges of the tire sections and to lack of stiffness therein. Further trouble was experienced due to lack of connection between the sections. These troubles I have overcome by providing the base and flanges of each section with a metal sheath and by interlocking the sections substantially as hereinafter more specifically described and then definitely claimed.

Figure 1:
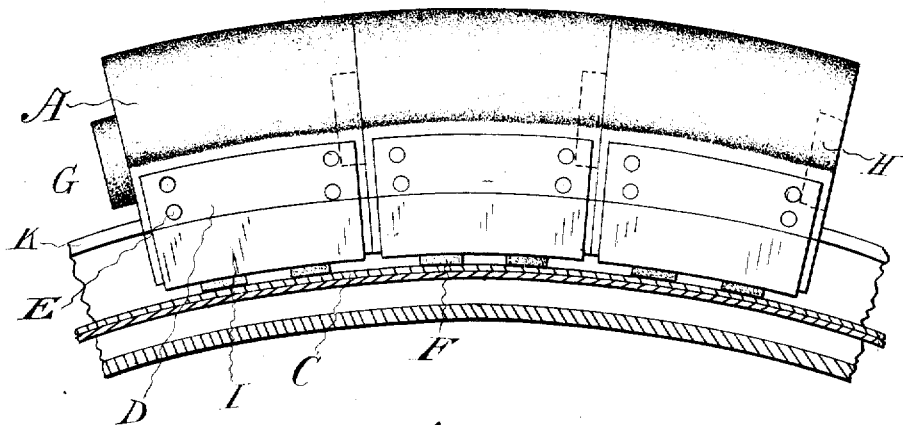
Figure 2:
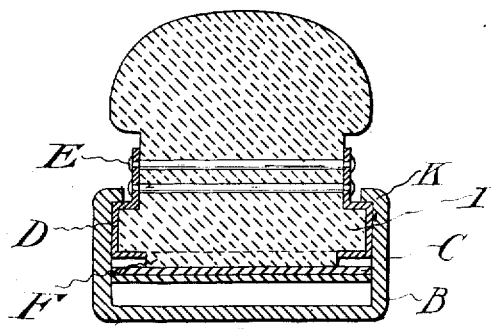
Figure 3:
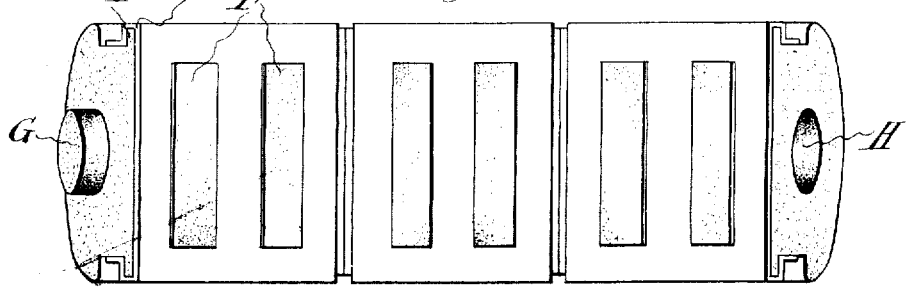

Figure 1 is a longitudinal section of part of a wheel rim showing three sections of the tire in side elevation. Fig. 2 is a cross section of the tire and rim. Fig. 3 is a plan view of the under side of the sections shown in Fig. 1.

A are rubber tire sections each having lateral flanges I formed on its base.

D are metal sheaths fitted to the base and flanges of each section and extending part way up the neck thereof. Rivets E preferably connect opposite sides of each sheath through the neck of the section. These metal sheaths are preferably shorter than the sections of the tire so that adjacent sheaths do not meet and an elastic cushion is formed between the sections. This feature is of importance as otherwise the flexibility of the tire under radial pressure would be interfered with. Openings or slots are formed in the under side of each metal sheath through which the rubber of the sections projects to form cushions F. These cushions F engage the hoop spring C which is fitted within the recess formed in the fixed metal rim B which is provided with inwardly turned flanges K which engage the upper sides of the flanges of the tire sections A. These cushions F ease the jar of the section on the hoop spring when the wheel is running on the road. The hoop spring C is preferably double as indicated in the drawing. As it is desirable that the sections should be so held together as to properly hold them in alinement I preferably provide each section with a projection G adapted to fit into a similarly shaped recess H formed in the adjacent section which interlocking however does not interfere with the resiliency of the individual section under radial pressure.

It will be found that a tire provided with my improvements will possess great durability with no decrease in elasticity as compared with similar tires unprovided with these improvements.

What I claim as my invention is:—

1. A tire section comprising a rubber section having lateral flanges at each side of its base and a projection at the under side of the base; and a metal sheath embracing the base and lateral flanges of the section and provided with an opening for the projection on the base of the section.

2. A tire section comprising a rubber section having lateral flanges at each side of its base and a projection at the under side of the base; and a metal sheath embracing the base and lateral flanges of the section slightly shorter than the section and provided with an opening for the projection on the base of the section.

3. In a vehicle tire the combination of a fixed recessed rim provided with inwardly extended annular flanges; a rubber tire formed in sections provided with laterally extending flanges fitting under the aforesaid rim flanges and a projection at the under side of the base, the sections being provided with interlocking means comprising a projection on one of the two adjacent sections fitting into a recess formed in the adjoining section; a metal sheath embracing the base and lateral flanges of each section and provided with an opening for the projection on the base of the section; and spring means pressing the sections radially outward.

Toronto 31st day of May 1909.

HOWARD H. HODGSON.

Signed in the presence of—
J. EDW. MAYBEE,
F. W. MCKENDRICK.